(12) United States Patent
Chiu et al.

(10) Patent No.: US 12,513,424 B2
(45) Date of Patent: Dec. 30, 2025

(54) TIME OF FLIGHT CORRECTION METHOD BY NEURAL NETWORK

(71) Applicant: HIMAX TECHNOLOGIES LIMITED, Tainan (TW)

(72) Inventors: Hong-Yu Chiu, Tainan (TW); Yi-Nung Liu, Tainan (TW); Chin-Jung Tsai, Tainan (TW); Yu-Hsuan Chu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 156 days.

(21) Appl. No.: 18/638,716

(22) Filed: Apr. 18, 2024

(65) Prior Publication Data

US 2025/0330728 A1     Oct. 23, 2025

(51) Int. Cl.
  *H04N 25/617* (2023.01)
  *G01S 7/292* (2006.01)
  *G01S 7/487* (2006.01)
  *G01S 7/493* (2006.01)
  *G01S 17/894* (2020.01)

(52) U.S. Cl.
  CPC ................................ *H04N 25/617* (2023.01)

(58) Field of Classification Search
  CPC ....... H04N 25/617; G01S 7/487; G01S 7/493; G01S 17/894; G01S 7/292; G01S 7/417; G01S 7/52077
  See application file for complete search history.

(56) References Cited

U.S. PATENT DOCUMENTS

| | | | |
|---|---|---|---|
| 9,542,749 B2 * | 1/2017 | Krupka | G06T 7/536 |
| 10,062,201 B2 * | 8/2018 | Nowozin | G01S 7/497 |
| 2014/0340569 A1 * | 11/2014 | Raskar | G01S 17/894 |
| | | | 348/370 |
| 2017/0262768 A1 * | 9/2017 | Nowozin | G06T 7/50 |
| 2021/0166127 A1 * | 6/2021 | Schaefer | G06N 3/08 |

FOREIGN PATENT DOCUMENTS

| | | |
|---|---|---|
| CN | 116106902 A | 5/2023 |
| EP | 3 832 351 A1 | 6/2021 |
| WO | 2024/038159 A1 | 2/2024 |

OTHER PUBLICATIONS

R. Lange et al., Solid-State Time-ofFlight Range Camera; IEEE j. Quantum Electronics, vol. 37, No. 3, pp. 390-397—Mar. 2001 (Year: 2001).*

(Continued)

*Primary Examiner* — Marly S Camargo
(74) *Attorney, Agent, or Firm* — Winston Hsu

(57) ABSTRACT

A time of flight correction method includes measuring a plurality of phases of electromagnetic waves and a plurality of amplitudes of the electromagnetic waves using a time of flight (ToF) module, inputting the plurality of phases and the plurality of amplitudes into a pre-trained neural network model to output a plurality of phase corrections, adding the plurality of phases and the plurality of phase corrections to output a plurality of corrected phases, and converting the plurality of corrected phases to output a plurality of corrected ranges between the ToF module and surrounding targets.

10 Claims, 5 Drawing Sheets

(56) References Cited

OTHER PUBLICATIONS

Kilho Son et al., Learning to Remove Multipath Distortions in Time-of-Flight Range Images for a Robotic Arm Setup, 2016 IEEE International Conference on Robotics and Automation (ICRA), May 16-21, 2016, p. 3390-3397, Stockholm, Sweden, XP032908538, May 16, 2016.
Julio Marco et al., DeepToF: Off-the-Shelf Real-Time Correction of Multipath Interference in Time-of-Flight Imaging, ACM Transactions on Graphics, vol. 36, No. 6, Article 219., Nov. 2017, p. 1-12, XP058473838, Nov. 2017.

* cited by examiner

TIME OF FLIGHT CORRECTION METHOD BY NEURAL NETWORK

BACKGROUND OF THE INVENTION

1. Field of the Invention

The present invention is related to a time of flight correction method, in particularly, to a time of flight correction method by neural network.

2. Description of the Prior Art

A time-of-flight (ToF) camera, also referred to as a time-of-flight sensor (ToF sensor), is an advanced imaging system designed for measuring distances between the camera and objects in the environment. It operates based on the concept of time-of-flight, which involves calculating the round trip time of an artificial light signal (typically emitted by a laser or a light emitting diode (LED)) as it travels to a target and back. Here are the key points about ToF sensors:
1. Measurement Principle:
   ToF cameras determine distances by analyzing the time it takes for light to travel from the camera to the subject and return. The emitted light pulse reflects off the object, and the camera measures the time it takes for the signal to complete this round trip.
2. Laser-Based Technology:
   ToF sensors use lasers or LEDs to generate the light pulses. Unlike traditional scanning LIDAR systems that capture data point-by-point, ToF cameras capture the entire scene with each laser pulse.
3. Applications and Ranges:
   ToF camera products have found applications in civil contexts since around the year 2000. These systems cover a wide range of distances, from a few centimeters up to several kilometers.
4. Components and Semiconductor Advances:
   The emergence of ToF cameras was facilitated by advancements in semiconductor processes. Components became fast enough to support the real-time calculations required for accurate distance measurements.

In summary, ToF sensors play a crucial role in various fields, including robotics, autonomous vehicles, and augmented reality, where precise distance information is essential for navigation and interaction with the environment.

However, the accuracy of a ToF module suffers from multipath interference (MPI). FIG. 1 is a ToF module 102 with MPI according to the prior art. In practical usage, the ToF module 102 transmits light signals from a laser or an LED and receives all reflected light signals, thus would calculate the TOF from various directions. The calculation of ToF may be affected by the MPI as shown in FIG. 1. The MPI might be generated by two reflections of surrounding objects 104. An ideal ToF should be calculated by a path with only one reflection, but multipath waves with two or more reflections are also received by the ToF module 102, thus affecting the accuracy of the ToF calculation.

SUMMARY OF THE INVENTION

An embodiment provides a time of flight correction method. The time of flight correction method includes measuring a plurality of phases of electromagnetic waves and a plurality of amplitudes of the electromagnetic waves using a time of flight (ToF) module, inputting the plurality of phases and the plurality of amplitudes into a pre-trained neural network model to output a plurality of phase corrections, adding the plurality of phases and the plurality of phase corrections to output a plurality of corrected phases, and converting the plurality of corrected phases to output a plurality of corrected ranges between the ToF module and surrounding targets.

These and other objectives of the present invention will no doubt become obvious to those of ordinary skill in the art after reading the following detailed description of the preferred embodiment that is illustrated in the various figures and drawings.

DETAILED DESCRIPTION

Multipath interference is a phenomenon encountered in wireless communications. It means that a radio signal is divided into two or more copies of the signal and reaches the receiving antenna through more than one path. Sometimes, under certain conditions, these signal waves will interfere with each other. The scattering of radio waves by the atmosphere, the reflection and refraction of radio waves by the ionosphere, and the reflection of radio waves by surface objects such as mountains and buildings will all cause multipath propagation. In a wireless transmission environment, radio waves will be reflected by surrounding objects to produce several reflected waves, which is called multipath waves. There will be a slight time difference between these multipath waves reaching the receiving end. When the delay time is too long, sometimes it will even interfere with the next transmitted signal, causing interference. At the same time, because each reflected wave passes through a different path, it will affect the phase and amplitude of the receiving wave when it reaches the receiving end. Therefore, when the receiving antenna mixes these signals, the phase and amplitude will be distorted, which is called multipath interference (MPI). In addition to the time delay that causes MPI, the movement of the transmitter and receiver as well as surrounding objects will also affect the MPI characteristics. In a ToF module, the MPI may be caused by surrounding objects such as tables and walls. The multipath interference can be represented as a diagram of time versus intensity, where time is the delay between the laser pulse emission and being received by the pixel, and intensity is the number of reflected photons. In the ideal case there is a single return, in mathematical terms this would be a Dirac function. Multipath interference can be caused in multiple different ways. It is an issue because it causes measurement errors in time-of-flight depth sensors.

Figure 1:
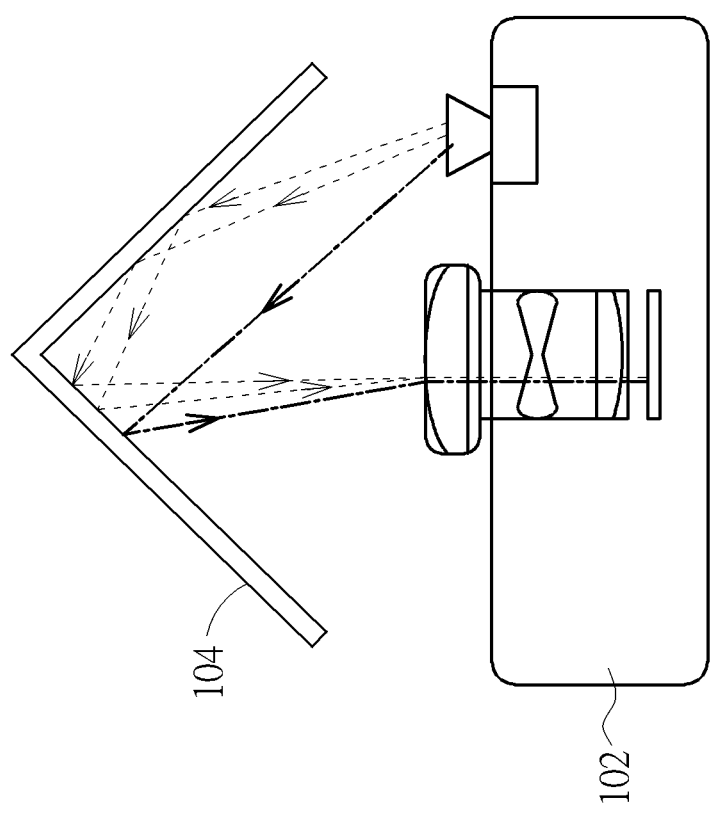
FIG. 1 is a time of flight (ToF) module with multipath interference (MPI) according to the prior art.
Figure 2A:
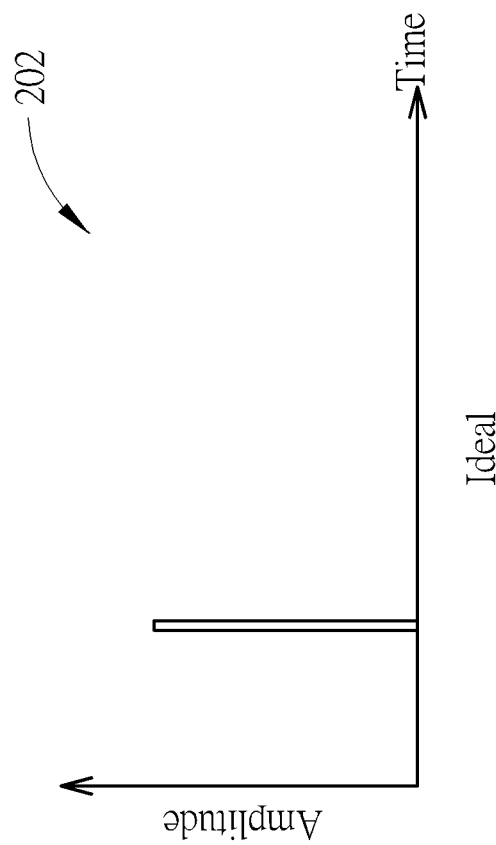
FIG. 2A is a schematic diagram of an ideal response of a ToF module.
Figure 2B:
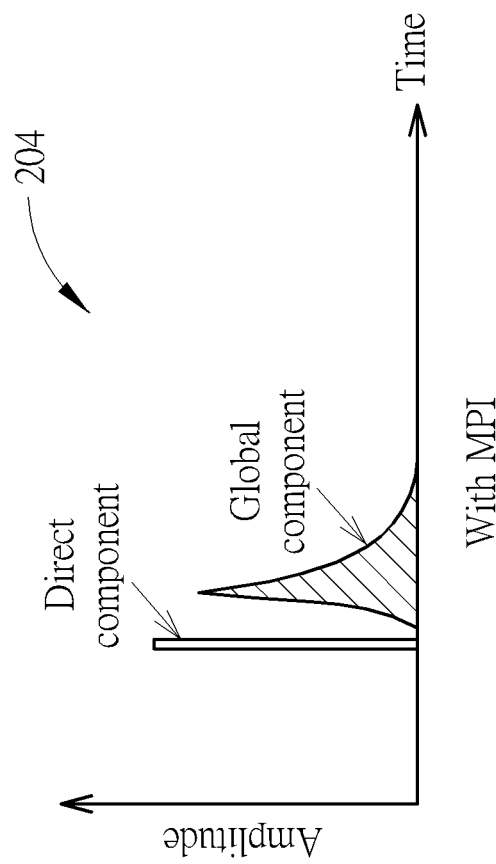
FIG. 2B is a schematic diagram of a response with MPI of a ToF module.

FIG. 2A is a schematic diagram of an ideal response 202 of a ToF module. FIG. 2B is a schematic diagram of a response 204 with MPI of a ToF module. In the ideal case, a reflected signal is received from the direct path with only one reflection, thus causing a single response in FIG. 2A. However, in real world, there are many paths can reflect the light signal back to the receiver, thus causing the MPI. When MPI occurs, the received signals contain a direct component which is reflected by only one reflection and a global component which contains reflected signals from a plurality of different paths. The direct component has the earliest arrival time, thus choosing the fastest component is the right way to calculate ToF. However, MPI would distort the shape of a response of a continuous sine wave, therefore a time of flight correction method using neural network is proposed.

The ToF correction method using neural network needs ground truths for training the neural network. Structured light is the process of projecting a known pattern (often grids or horizontal bars) on a scene to calculate depths of the surrounding objects. By setting a structured light module and a ToF module on a tripod, the ranges to the surrounding objects can be obtained by both the structured light module and the ToF module. The measured phases and amplitudes of the ToF module can provide inputs of the neural network, and the measured ranges and calculated phases by the structured light module can be the ground truths of the neural network.

Figure 3:
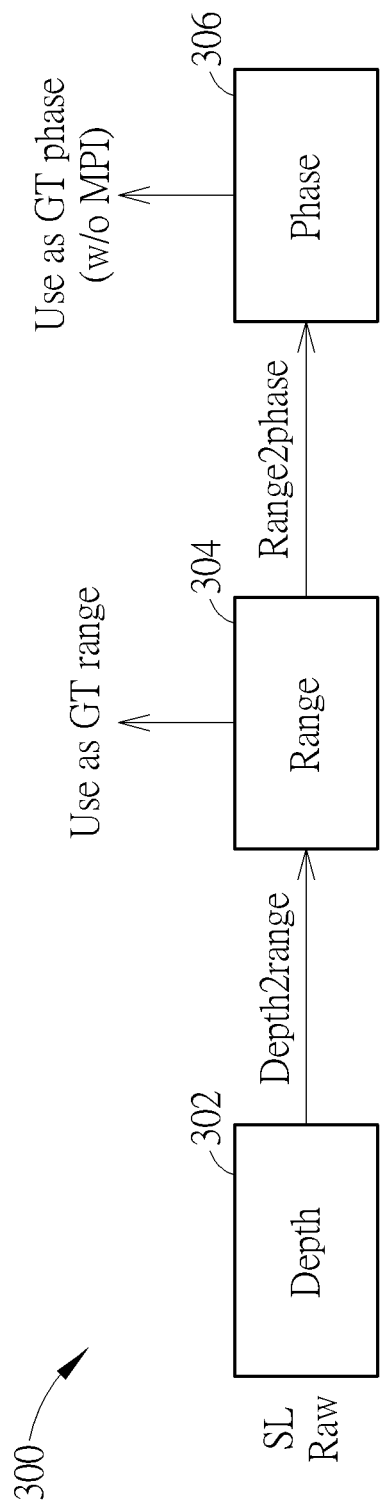
FIG. 3 is a schematic diagram for a transform of the measured result from the structured light module according to an embodiment of the present invention.

FIG. 3 is a schematic diagram for a transform 300 of the measured result from the structured light module according to an embodiment of the present invention. Firstly, the structured light measures depths 302 of the surrounding objects, and the depths 302 are converted into ranges 304 by a depth to range function. The ranges 304 can thus be the ground truths of the neural network. Secondly, the ranges 304 are converted to phases 306 by a range to phase function. The phases 306 can provide the ground truths of the neural network. These phases 306 are generated from the measurement results of the structured light module, therefore avoiding the MPI.

Figure 4:
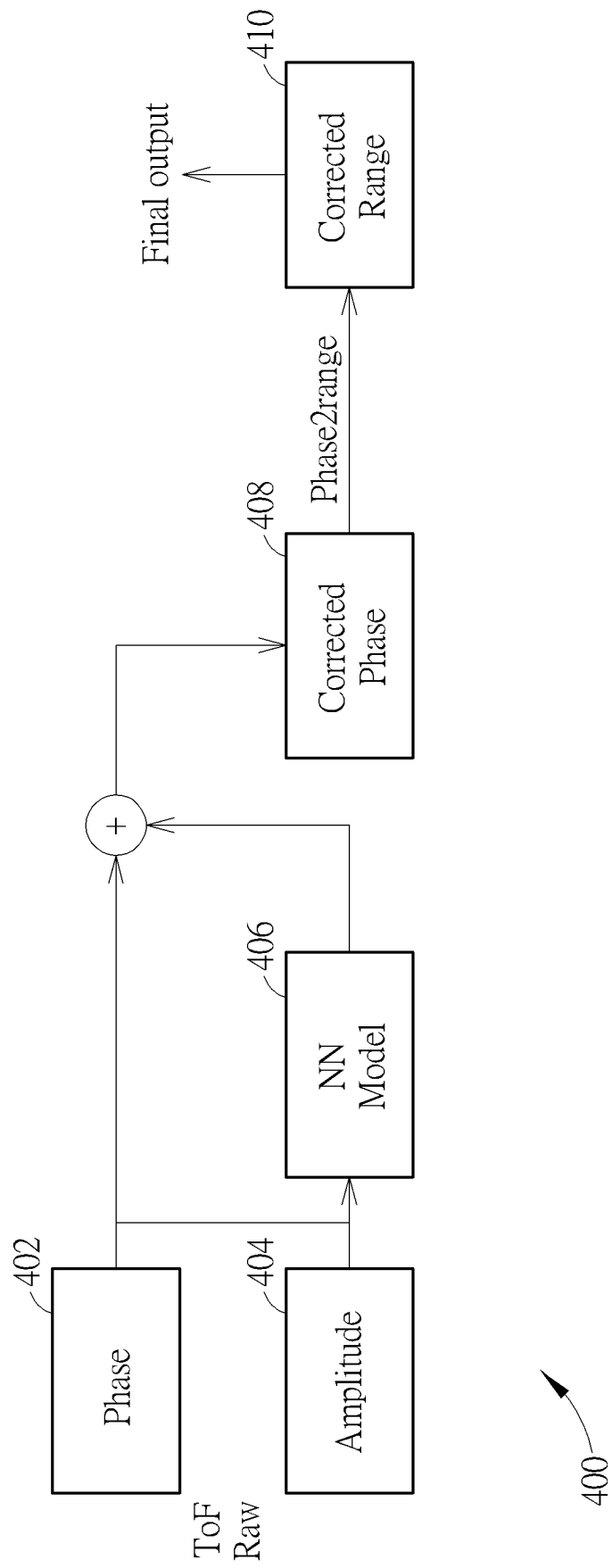
FIG. 4 is a schematic diagram for a transform of the measured result from the time of flight module according to an embodiment of the present invention.

FIG. 4 is a schematic diagram for a transform 400 of the measured result from the time of flight module according to an embodiment of the present invention. The ToF module measurement provides raw phases 402 and raw amplitudes 404. The raw phases 402 and raw amplitudes 404 are the inputs of the neural network model 406, the outputs of the neural network model 406 are phase corrections which can be added to the raw phases 402 to generate corrected phases 408. The corrected phases then are transformed by a phase to range function to generate corrected ranges 410 as the final outputs.

In an embodiment, the neural network can be a convolutional neural network (CNN), and the CNN includes four convolutional layers and four activation layers. The raw phases and raw amplitudes are measured by continuous sine waves with various frequencies. The various frequencies may include 80 MHz and 100 MHz. In this embodiment, the input dimensions of the neural network model are 160×160×4. The four input channels of the neural network model are phase of 80 MHZ sine wave, amplitude of 80 MHZ sine wave, phase of 100 MHz sine wave and amplitude of 100 MHz sine wave. The output dimensions of the neural network model are 160×160×2. The two output channels of the neural network model are corrected phases of 80 MHz sine waves and corrected phases of 100 MHz sine waves. In an embodiment, the ToF module measures 480×640 image at one time. Therefore, the neural network should predict 3×4=12 times to provide a full corrected ToF image because the x and y dimensions of the neural network is 160×160. The size of the x and y dimensions of the neural network is limited to the memory of neural processing unit (NPU), thus the size of the x and y dimensions cannot be 480×640 when using NPU. However, the present invention includes but is not limited to x and y dimensions of 160×160. The x dimension and y dimension can be any positive integers.

In prior art, the losses of neural network are L1 (x, y), where x is the original phase and y is the predicted phase. However, the phase is a periodic parameter with a period of 2π, thus the L1 (x, y) may generate a distorted error. For example, x=−3.0 and y=3.0, in L1 calculation, the loss is 6.0. However, the real loss should be about 0.28 because x=−3.0 is the same as about x=3.28 (−3.0+2π), which is only 0.28 away from y=3.0. Therefore, in an embodiment of the present invention, the loss can be calculated as follows:

$$\text{loss} = \left| \tan^{-1}\left( \frac{\sin(x-y)}{\cos(x-y)} \right) \right|$$

where x is the original phase and y is the predicted phase.

By using this formula, the loss can be correctly calculated to illustrate the phase differences.

Figure 5:
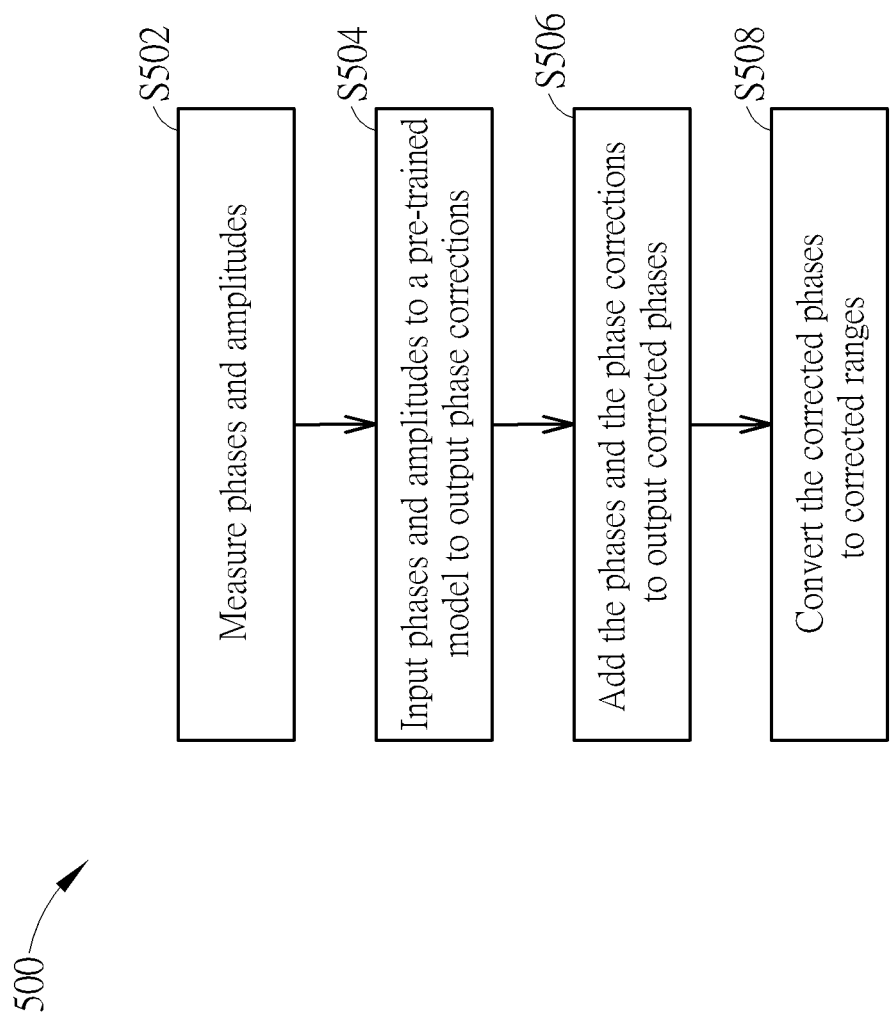
FIG. 5 is a flowchart of the time of flight correction method using neural network according to an embodiment of the present invention.

FIG. 5 is a flowchart of the time of flight correction method 500 using neural network according to an embodiment of the present invention. The ToF correction method includes the following steps:

Step S502: measure phases and amplitudes;
Step S504: Input phases and amplitudes to a pre-trained model to output phase corrections;
Step S506: Add the phases and the phase corrections to output corrected phases; and
Step S508: Convert the corrected phases to corrected ranges.

In step S502, a plurality of phases of electromagnetic waves and a plurality of amplitudes of the electromagnetic waves are measured using a time of flight (ToF) module. In step S504, the plurality of phases and the plurality of amplitudes are inputted into a pre-trained neural network model to output a plurality of phase corrections. In step S506, the plurality of phases and the plurality of phase corrections are added together to output a plurality of corrected phases. In step S508, the plurality of corrected phases are converted to output a plurality of corrected ranges between the ToF module and surrounding targets. In an embodiment, step S508 includes applying phase to range conversion on the plurality of corrected phases to generate the plurality of corrected ranges.

In conclusion, the time of flight correction method using the neural network model provides a phase corrections of the original phases measured by the ToF module with multipath interference (MPI) to generate the corrected ranges and improve the accuracy of the ToF module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time of flight correction method comprising:
   measuring a plurality of phases of electromagnetic waves and a plurality of amplitudes of the electromagnetic waves using a time of flight (ToF) module;

inputting the plurality of phases and the plurality of amplitudes into a pre-trained neural network model to output a plurality of phase corrections;

adding the plurality of phases and the plurality of phase corrections to output a plurality of corrected phases; and converting the plurality of corrected phases to output a plurality of corrected ranges between the ToF module and surrounding targets.

2. The method of claim 1, wherein the pre-trained neural network model is a convolutional neural network (CNN) model.

3. The method of claim 2, wherein the convolutional neural network (CNN) model comprises four convolutional layers and four activation layers.

4. The method of claim 1, further comprising training a neural network model using a measurement result from structured light as ground truth to generate the pre-trained neural network model.

5. The method of claim 1, wherein inputting the plurality of phases and the plurality of amplitudes into the pre-trained neural network model to output the plurality of phase corrections is inputting the plurality of phases and the plurality of amplitudes measured by continuous sine waves with various frequencies into the pre-trained neural network model to output the plurality of phase corrections.

6. The method of claim 5, wherein the various frequencies comprise 80 MHz and 100 MHz.

7. The method of claim 6, wherein input dimensions of the pre-trained neural network model are 160×160×4.

8. The method of claim 7, wherein four input channels of the pre-trained neural network model are phases of 80 MHz sine waves, phases of 100 MHz sine waves, amplitudes of 80 MHz sine waves, and amplitudes of 100 MHz sine waves.

9. The method of claim 7, wherein output dimensions of the pre-trained neural network model are 160×160×2.

10. The method of claim 9, wherein two output channels of the pre-trained neural network model are corrected phases of 80 MHZ sine waves and corrected phases of 100 MHz sine waves.

* * * * *